(No Model.)

J. PENDERGAST.
WHIFFLETREE COUPLING.

No. 256,364. Patented Apr. 11, 1882.

Witnesses,
J. H. Shumway
Jos. C. Earle

James Pendergast
Inventor
By atty.
Jno. C. Earle

UNITED STATES PATENT OFFICE.

JAMES PENDERGAST, OF NEW HAVEN, CONNECTICUT.

WHIFFLETREE-COUPLING.

SPECIFICATION forming part of Letters Patent No. 256,364, dated April 11, 1882.

Application filed January 16, 1882. (No model.)

*To all whom it may concern:*

Be it known that I, JAMES PENDERGAST, of New Haven, in the county of New Haven and State of Connecticut, have invented a new Improvement in Whiffletree-Couplings; and I do hereby declare the following, when taken in connection with the accompanying drawings and the letters of reference marked thereon, to be a full, clear, and exact description of the same, and which said drawings constitute part of this specification, and represent, in—

Figure 1:
Figure 2:
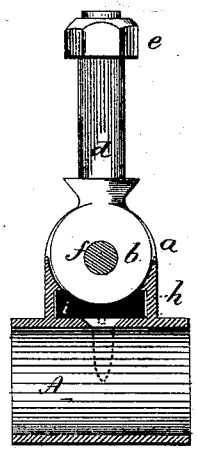
Figure 3:
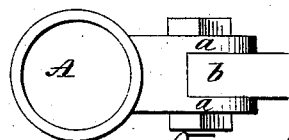

Figure 1, a top or plan view; Fig. 2, a horizontal section; Fig. 3, a side view.

This invention relates to an improvement in the coupling employed for attaching the whiffletree to the cross-bar or evener in coaches or carriages designed for two horses. In this class of couplings the whiffletree lies in substantially the same horizontal plane as the evener or cross-bar, and hence cannot be secured upon the top of that evener or cross-bar, as in single carriages. The coupling by which the whiffletree is so secured is in many cases made from a strap of leather around both the whiffletree and cross-bar, with a clamp upon it between the whiffletree and the cross-bar; but this construction has so many objections that it is fast going out of use, and is superseded by a metal sleeve around the whiffletree, hinged to the head of a bolt which extends backward through the cross-bar, and so as to permit the requisite play of the whiffletree; but in this construction a serious difficulty exists, because, while the joint may be so firm when first applied as to prevent rattling, the natural wear upon the joint soon produces a looseness and rattle which is objectionable. Various devices have been employed for overcoming this difficulty, such as making the joint so as to be tightened by the bolt; but this relief is temporary only.

The object of my invention is to construct the coupling so that no matter how loose the joint may be rattling will be prevented; and it consists in constructing a recess between the ears on the sleeve and forward of the hinging-bolt and arranging in such recess an elastic or yielding material, against which the head of the other part of the coupling will bear, the said yielding material producing a pressure between the two parts, tending to force them asunder and hard against the hinging-bolt, as more fully hereinafter described.

A represents the sleeve through which the whiffletree is passed in the usual manner. On the rear side the sleeve is constructed with ears *a a*, leaving a recess between them to receive the head *b* of the second part of the coupling, this head being constructed with a tail, *d*, extending rearward through the cross-bar, where it is secured by a nut, *e*, upon the opposite side, the two parts being secured together by a bolt, *f*, which forms the pintle upon which the one part turns upon the other as a hinge. Between the ears *a*, and forward of the space occupied by the head *b*, I construct a recess, *h*, and into this recess I introduce a block, *i*, of india-rubber or other suitable flexible or elastic material which will take a firm seat in the recess and bear hard against the head *b*, the tendency of such bearing being to force the two parts from each other—that is, one in one direction and the other in the opposite, and upon the bolt *f*. This permits the sleeve A, with the whiffletree, to turn on the bolt or pintle *f* for the necessary vibration; but because of the constant pressure of the elastic block *i* the bearing between the two parts will be always firm, notwithstanding the bolt may be worn to a considerable extent, and the rattle which would otherwise occur will be thereby avoided. The whiffletree is secured in the sleeve by a screw introduced between the ears, as indicated in Fig. 2.

I do not wish to be understood as broadly claiming the employment of an elastic material to prevent rattling of a joint in carriages, as such I am aware is not new; but What I do claim is—

The herein-described coupling, consisting of the sleeve A to receive the whiffletree, constructed with ears upon the rear side, with a recess, *h*, between the said ears and forward of the pivot, combined with the head *b*, secured between said ears by the pintle *f*, and an elastic block, *i*, arranged in said recess to bear against the sleeve in one direction and the head in the opposite direction, substantially as described.

JAMES PENDERGAST.

Witnesses:
JOHN E. EARLE,
JOS. C. EARLE.